Patented June 24, 1930

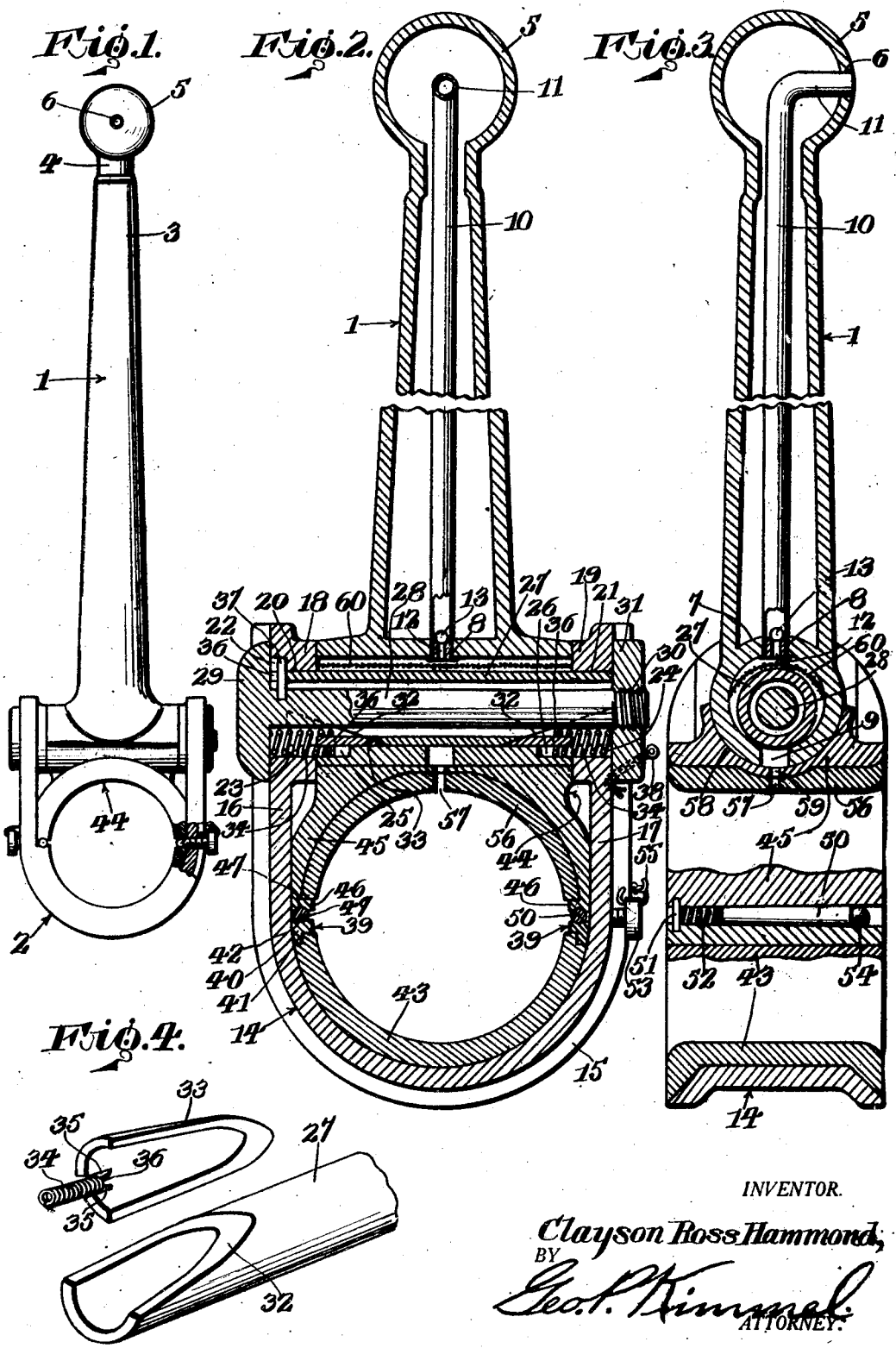

1,767,882

UNITED STATES PATENT OFFICE

CLAYSON ROSS HAMMOND, OF SALEM, OREGON

CONNECTING ROD

Application filed June 28, 1928. Serial No. 288,899.

This invention relates to a connecting rod and has for its object to provide, in a manner as hereinafter set forth a rod of such class constructed and arranged to provide for the self-aligning thereof.

A further object of the invention is to provide, in a manner as hereinafter set forth, a connecting rod including a tubular tapered body having a hollow ball on one end and a tubular cross head on the other end and with means coacting with the cross head to provide for the self-aligning of the rod.

A further object of the invention is to provide, in a manner as hereinafter set forth, a connecting rod so constructed and arranged to not only provide for the self-aligning thereof but also for self-lubrication.

A further object of the invention is to provide, in a manner as hereinafter set forth, a connecting rod including a pivoted cross head coupled with a crank shaft by a means including a saddle for the cross head.

A further object of the invention is to provide, in a manner as hereinafter set forth, a connecting rod including a globular element at one end for connection with a piston and a pivoting cross head at its other end coupled with the crank shaft by a means including a saddle for the cross head and further with said means including coacting elements to provide for self-aligning of the rod during its operation.

A further object of the invention is to provide, in a manner as hereinafter set forth, a connecting rod including a pivoting cross head coupled with a crank shaft by a spring controlled, automatically adjustable means for accurately aligning the bearing elements between the connecting rod and the crank shaft.

A further object of the invention is to provide, in a manner as hereinafter set forth, a connecting rod constructed and arranged to provide for the self-lubrication of the bearings therefor.

A further object of the invention is to provide, in a manner as hereinafter set forth, a connecting rod including a pivoting cross head and a crank box for coupling the cross head to the crank shaft and with the box including means for self-aligning the bearings for the crank of the shaft and for the cross head of the rod.

Further objects of the invention are to provide, in a manner as hereinafter set forth, a connecting rod which is comparatively simple in its construction and arrangement, strong, durable, self-aligning, thoroughly efficient in its use, conveniently assembled, self-lubricating, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is an elevation, partly in section, of a connecting rod and crank box in accordance with this invention.

Figure 2 is a vertical sectional view of the connecting rod and crank box in accordance with this invention.

Figure 3 is a vertical sectional view of the connecting rod and crank box, in accordance with this invention, taken at right angles to that shown in Figure 2.

Figure 4 is a fragmentary view, disassembled and in elevation of the adjustable coupling sleeve.

The connecting rod is referred to generally at 1 and the crank box generally at 2.

The connecting rod is of the desired length and comprises a tapered, tubular body portion 3 terminating at its upper end in a tubular cylindrical extension 4 which merges into a hollow spherical head or end 5 of greater diameter than the extension 4 and which is adapted to be coupled with the piston of a cylinder, not shown. The end 5 permits of a universal joint connection between the rod 1 and the piston not shown. The end 5 is formed with an opening 6. The enlarged end of the body portion 3 merges into and is formed integral with the top of a tubular cross head 7 open at each end. That end of the body portion 3 which is formed integral with the top of the cross head 7 is disposed centrally with respect to the latter.

The cross head 7 can be of any desired length and it is formed centrally of its top with an opening 8. The cross head 7 directly below the opening 8 is formed with an opening 9, or in other words, the openings 8, 9 are diametrically opposed.

Extending through the opening 8 and connected to the cross head 7 is the lower end of a lubricant conducting pipe 10 which is disposed centrally with respect to the body portion 3 and is of a length to extend into the end 5. The upper end of the pipe 10 is formed with a right angularly disposed bend 11 which is extended into and connected to the wall of the opening 6. The edge of the bend 11 is flush with the periphery of the end 5. Arranged within the lower end of the pipe 10 is an apertured plug 12 which provides a seat for a ball valve 13. The pipe 10 supplies lubricant to the interior of the piston bearing and the lubricant from said cross head is discharged through the plug 12.

The crank box 2 comprises a U-shaped strap 14 having coextensive with its outer face a pair of spaced ribs 15 which have their outer side edges flush with the edges of the strap 14. One of the legs of the strap 14 is indicated at 16 and the other at 17. The inner faces of the straps 16, 17 at the upper ends thereof are formed with inwardly extending enlargements 18, 19 respectively. The straps 16, 17 in proximity to their upper ends are provided with openings 20, 21 respectively. The wall of the opening 20 is cut away to provide a pocket 22. The pocket 22 is positioned in the top of the wall 20 at the outer end thereof. The bottoms of the walls of the openings 20, 21 are provided with grooves 23, 24 respectively. The inner face of the cross head 7, at the bottom thereof and at its end is formed with grooves 25, 26 and the former forms a continuation of the groove 23 and the latter a continuation of the groove 24 in the enlargements 18, 19.

The cross head 7 is positioned between the enlargements 18, 19.

Extending through the straps 16, 17 and also through a sleeve 27 is the shank 28 of a coupling bolt. The diameter of the shank 28 is materially less than the inner diameter of the sleeve 27. The coupling bolt includes a head 29 at one end of the shank 28 and which abuts against the outer face of the strap 16. The shank 28 at its free end is peripherally threaded as at 30 and which carries a securing nut 31 abutting against the outer face of the strap 17. The sleeve 27 is of an outer diameter to snugly engage the walls of the openings 20, 21 and said sleeve has its ends flush with the outer faces of the straps 16, 17. The lower face of the sleeve 27 at each end thereof is cut away to provide oppositely disposed beveled edges 32 which extend at an upward inclination from a point removed from the ends of the sleeve. Associated with each edge 32 is a wedge member 33, which is hollow and has its inner and outer faces extend upon the same arc as the inner and outer faces of the sleeve 27 whereby the periphery of the wedge 33 will form continuations of the periphery of the sleeve 27. Each wedge is spring controlled and the controlling springs therefor are indicated at 34. One of said springs is positioned in the grooves 23, 25 and the other in the grooves 24, 26. That spring 34 positioned in the grooves 23, 25 abuts against the head 29 of the coupling bolt. That spring positioned in the grooves 24, 26 abuts against the nut 31. The outer end of each wedge 33 is slitted as at 35, and the material freed by the slits provides a lug 36.

The sleeve 27 is slotted at one end as at 36 and which registers with the pocket 22. Extending through the pocket 22 and notch 36 and engaging the shank 28 is a dowel pin 37. Extending through the nut 31 and seating in the leg 17 is a cotter 38 to prevent turning of the nut 31.

Arranged against the inner face of each of the straps, and of a length corresponding to the width of such face is an abutment 39 of angle-shaped cross section and which includes a horizontally disposed leg 40 and a vertically disposed leg 41 of less thickness than the leg 40 and which is arranged against the inner face of the leg. The leg 40 projects inwardly with respect to the top of the leg 41. The upper face of the leg 40 is grooved as at 42 to provide a seat. Positioned within the strap 14 is a semi-circular bushing or bearing 43 which extends from one abutment 39 to the other and which is of a width greater than the width of the abutment 39 whereby the bushing 43 will project inwardly with respect to the abutment. The top edges of the bushing 43 abut against and enclose the legs 41 and also abut against the lower face of the legs 40 as well as project inwardly therefrom.

Arranged within the strap 14, above and spaced from the abutment 39 is a bearing cap referred to generally at 44, and which includes an inverted semi-circular part 45 having its ends provided with inwardly extending flanges 46 opposing and spaced from the abutment 39. The end edges of the part 45 are grooved as at 47 to provide seats which oppose the seat 42. Interposed between the flanges 46 and abutment 39 and seated in the grooves 42, 47 are tapered spring controlled pins 49, 50 and the former is oppositely disposed with respect to the latter and each of the pins is of less length than the width of the strap 14 and the bearing cap.

Dowels 51 interengage with the lower ends of the part 45 and abutments 39 and are positioned to oppose the smaller ends of the pins 49, 50. Interposed between the dowels 51 and the smaller ends of the pins 49, 50 are coiled controlling springs 52. Carried by the legs 16, 17 of the strap 14 are adjusting screws 53 for the pins 49, 50 and each of said screws has a tapered inner end 54 to ride against the enlarged end of a pin 49, or 50, for the purpose of adjusting the same. A flexible wire retainer 55 is provided for the screws 53 and each retainer extends through the head of a screw and also through a rib 15.

Positioned against the inner face of the part 45, seating against the flanges 46, as well as projecting inwardly from these latter is a semi-circular bushing or bearing 56 provided centrally of its top with an opening 57. The bushing or bearing 43 is of uniform thickness throughout whereas the bushing or bearing 56 gradually increases in thickness from its end toward its center. The top of the part 45 is extended and shaped to form a semi-circular saddle 58 for the cross head 7 of the connecting rod. The top of the part 45 is formed with an opening 59 which registers with the opening 57 and is adapted to register with the opening 9. The top of the saddle 58 is positioned below the upper ends of the straps 16, 17 and is furthermore arranged between the opposed inner faces of the enlargements 18, 19 at the lower portions of these latter. The length of the saddle 58 corresponds to the length of the cross head 7. The dowel 37 prevents the turning of the coupling bolt and sleeve 27 relative to the straps 16, 17. The openings 9, 57 and 59 provide for the passage of lubricant from the interior of the crank box 7 to the interior of the cross head 7.

Arranged within the cross head 7 is a filter 60 for the lubricant.

The action of the wedges forced in by the springs is to force the cross head downward into the cross head saddle, the cross head saddle being an integral part of the bearing cap. The advancing of the wedges forces cross head together with bearing cap down tight to taper pin liners. Should any wear take place at cross head saddle or cross head contact, it will be seen that wedges will force coupling sleeve at both ends to complete bearing in the top of bearing strap holes. This wedge action will continue while the engine is running and the wedges will be promoted to retain the cross head firm in the saddle by the impulse imparted from the piston to the connecting rod. This running condition will continue with a mild friction present at the ends of the cross head abutting the enlargements 18, 19. This friction is caused by the tension of the coupling bolt. It will be seen that a small movement in each direction parallel to the center line of crank shaft will be permitted at the spherical end 5 of the connecting rod through the stroke of the same. This movement is used where large tolerance is present in an engine in regard to crank pin square with the cylinders, cylinders parallel with each other, crank shaft parallel with cylinder center line, crank shaft at right angles with the cylinders, position of crank pin to center of cylinders, end motion of crank shaft, and distortion of connecting rod that may be caused by heat or stress. It will be seen that any error of alignment in any one or all of the positions of the cylinders to crank shaft will call upon crank box cross head for its variable frictional alignment.

The abutments 39 are welded to the bearing strap and each are reamed with standard taper one-third the depth of the diameter of tapered pin. The action of the tapered pins, pointed thumb adjusting screws, and springs 52 is that the screws adjust the pins against the action of the springs. The screws are arranged to engage by the cone or tapered ends thereof with the enlarged ends of the tapered pins. The enlarged ends of the tapered pins are oval. The small ends of the tapered pins abut springs 52. The dowels 51 provide stops for the springs 52. It will be seen that when crank box is assembled on crank pin with thumb screws backed out a distance equal to one-half the diameter of the tapered pins, the springs will push the pins back to a free position. Then by the insertion of the wedges 33 with a slight pressure brought by coupling bolt and nut, there will be obtained a contact of crank pin and crank box bearing. The thumb screws are then turned to a firm contact with the oval heads of the tapered pins. This gives a spacing of bearing and bearing cap equal to the diameter of the crank pin. A running fit for force feed oiling can be established by retracting the wedges 33, turning adjusting screws inward for a fraction of a turn whereby the tapered pins will be adjusted and the springs 52 compressed, and bearing and bearing cap lined apart approximately .002″ plus crank pin diameter. The dowel pins are located firmly in the abutments and are disposed diagonally relative to each other and provide stops for the springs 52. The adjusting screws are also located diagonally with respect to each other. The dowels are positioned to oppose the small ends of the tapered pins and the adjusting screws are arranged to oppose the larger ends of the tapered pins.

It is thought the many advantages of a connecting rod and crank box in accordance with this invention, can be readily understood, and although the preferred embodiment of the invention is as illustrated and described, yet it is to be understood that changes in details of construction can be had which fall within the scope of the invention as claimed.

What I claim is:

1. A connecting rod comprising a tubular body portion having a tubular cross head at and closing one end thereof and a hollow globular head at and opening into its other end.

2. A connecting rod comprising a tubular body portion having a tubular cross head at and closing one end thereof and a hollow globular head at its other end, said globular enlargement opening into said body portion and having means for retaining one end of a lubricant conducting pipe, and said cross head having means for receiving the other end of said pipe and further having a valve controlled means for establishing communication between the interior of the cross head and said pipe.

3. A connecting rod comprising a tubular body portion having a tubular cross head at and closing one end thereof and a hollow globular head at and opening into its other end, a lubricant conducting pipe arranged within said body and head, opening at one end through one side of the head and having its other end opening into the cross head, and a check valve within that end of the pipe communicating with the cross head.

4. A connecting rod comprising a tubular body portion having a tubular cross head at one end thereof and a hollow globular head at its other end, a bearing cap provided with a saddle for said cross head, a bearing strap having said cap mounted therein, and means carried by the strap and extending through the cross head for connecting it to the strap and for maintaining the bearing cap in position.

5. A connecting rod comprising a tubular body portion having a tubular cross head at one end thereof and a hollow globular head at its other end, a bearing cap having a saddle for the reception of the cross head, a bearing strap supporting said bearing cap, means for coupling the cross head to the strap whereby the cap may be retained in position, and spring controlled aligning means for the cross head and cap, said means arranged within the strap and engaging said coupling means and cap.

6. A connecting rod comprising a tubular body portion having a tubular cross head at one end thereof and a hollow globular head at its other end, and a crank box connected to and pivotally supporting said cross head, said box provided with bearings for the crank and with means for automatically aligning said cross head and bearings.

7. A connecting rod comprising a tubular body portion having a tubular cross head at one end thereof, a bearing cap provided with a saddle for said cross head, a bearing strap having said cap mounted therein, and means carried by the strap and extending through the cross head for connecting it to the strap and for maintaining the bearing cap in position.

8. A connecting rod comprising a tubular body portion having a tubular cross head at one end thereof, a bearing cap having a saddle for the reception of the cross head, a bearing strap supporting said bearing cap, means for coupling the cross head to the strap whereby the cap may be retained in position, and spring controlled aligning means for the cross head and cap, said means arranged within the strap and engaging said coupling means and cap.

9. A connecting rod comprising a tapered, tubular body portion having a tubular cross head integral with and closing the largest end thereof and a hollow globular head integral with and opening into the smallest end thereof.

10. A connecting rod comprising a tapered, tubular body portion having a tubular cross head integral with and closing the largest end thereof and a hollow globular head integral with and opening into the smallest end thereof, said head being of greater diameter than the said smallest end.

11. A connecting rod comprising a tubular body portion having a tubular cross head at one end thereof and a hollow globular head at its other end, a bearing cap provided with a saddle for said cross head, a bearing strap having said cap mounted therein, means carried by the strap and extending through the cross head for connecting it to the strap and for maintaining the bearing cap in position, and bearing adjusting means interposed between the cap and strap.

12. A connecting rod comprising a tubular body portion having a tubular cross head at one end and a hollow globular head at its other end, a bearing cap provided with a saddle for said cross head, a strap having its ends opposing said cross head, said strap enclosing said cap, a sleeve carried by the ends of the strap, extending through said cross head and having beveled ends, means abutting the ends of the strap and sleeve and extending through the latter for connecting the cross head and sleeve to the strap, and a pair of oppositely disposed, spring pressed wedges coacting with the beveled ends of the sleeve and mounted in said cross head and strap.

13. A connecting rod comprising a tubular body portion having a tubular cross head at one end and a hollow globular head at its other end, a bearing cap provided with a saddle for said cross head, a strap having its ends opposing said cross head, said strap enclosing said cap, a sleeve carried by the ends of the strap, extending through said cross head and having beveled ends, means abutting the ends of the strap and sleeve and extending through the latter for connecting the cross head and sleeve to the strap, and a pair of oppositely disposed, spring pressed wedges coacting with the beveled ends of the sleeve and mounted in said cross head and strap, an upper bushing positioned within the cap, a lower bushing within the strap, and bearing adjusting means between the cap and lower bushing.

In testimony whereof, I affix my signature hereto.

CLAYSON ROSS HAMMOND.